United States Patent [19]

Lai

[11] Patent Number: 6,019,950
[45] Date of Patent: Feb. 1, 2000

[54] OZONE AND WATER MIXING DEVICE

[76] Inventor: Fute Lai, No. 35, Shih Chien St., Tainan, Taiwan

[21] Appl. No.: 09/148,111

[22] Filed: Sep. 4, 1998

[51] Int. Cl.$^7$ .................................................. B01J 19/08
[52] U.S. Cl. ...................................................... 422/186.12
[58] Field of Search ............... 204/157.1 R; 422/186.07, 422/186.3, 186.12

[56] References Cited

U.S. PATENT DOCUMENTS 4,124,467 11/1978 Pincon ............................. 204/157.1 R Primary Examiner—Kathryn Gorgos
Assistant Examiner—Thao Tran
Attorney, Agent, or Firm—Rosenberg, Klein & Lee

[57] ABSTRACT

An ozone and water mixing device comprised of a mixer, an actuator and an ozone generator, within, the mixer contains a standpipe connected to a lateral pipe to form a tee with one end of the standpipe connected to a tap; a screen mesh having a multiple of spiral provided in the end while the other end of the standpipe is an outlet for the ozone mixed with water the lateral pipe is connected to a one-way valve and farther to the outlet of the ozone generator. The actuator refers to a cylinder inserted with a plunger, and a spring at its bottom holding against the plunger which is linked to a switch of an electric circuit to activate the air inlet provided at the ozone generator, so that upon starting the water supply, the electric circuit is automatically activated allowing the ozone to be supplied from the ozone generator for the mixer to output the water mixed with ozone.

4 Claims, 6 Drawing Sheets

OZONE AND WATER MIXING DEVICE

FIELD OF INVENTION

The present invention relates to a mixing device for ozone and water, more particularly to a device which upon the supply of water automatically activates without relying on any pump an electric circuit to deliver the ozone from an ozone generator to a mixer to supply the water mixed with ozone.

BACKGROUND OF THE INVENTION

Growers of agricultural products or domestic animal raisers have been frequently resolved to the spray of pesticides or the administration of antibiotics to avoid pest or promote the growth as the case may be. Those edibles when not properly treated, the chemical toxicity contained in such pesticide or antibiotic could be at a concentration sufficient to be blamed for many modern diseases that seriously threaten the health of the people. Accordingly, ozone ($O_3$) as a powerful pesticide and deodorizer, has been utilized for the development of an ozone pesticide system as illustrated in FIG. 6. The structure of such a system is essentially comprised of a cylindrical seat (5) separated with a separation board (51) permitting an upper space (52) and a lower space (53), an ozone generator (6) is provided within said lower space (53), the ozone is drawn with a pump (7) into the upper space (52) of the cylindrical base (5). To rinse the edible, e.g. the vegetable (8), it is placed in the upper space (52) of the cylindrical base (5) to be rinsed by the ozone dissolved in water.

However, the prior art is found with the following defectives:

1. The way said ozone is pumped into the water prevents a well distributed concentration of ozone, thus some parts of the objects to be rinsed, particularly those are located in the corners will be prevented from a thorough rinse.
2. Though being solvable in water, the ozone dissolves slower when a mass volume of water is applied, thus, the rinse effect is significantly reduced.
3. The cylinder base of such structure is limited to rinse the fresh or the green, and not applicable at all when water purification or larger object to be rinsed is required.
4. Said structure requires the installation of motor, pump and many other spares to make it far from being compact, and consequently, its manufacturing cost, selling price and service cost are relatively higher.

SUMMARY OF THE INVENTION

The primary purpose of the present invention is to provide an ozone and water mixing device that is cost and space saving and capable of operation without an air pump. It is essentially comprised of a mixer, an actuator and an ozone generator, with, said mixer contains a standpipe connected to a lateral pipe to form a tee with one end of said standpipe connected to a tap; a screen mesh having a multiple of spiral hole provided in said end while the other end of said standpipe is an outlet for the ozone mixed with water, said lateral pipe is connected to a one-way valve and further the outlet of the ozone generator. Said actuator refers to a cylinder inserted with a plunger, and a spring as its bottom holding against said plunger which is linked to a switch of an electric circuit to activate the air inlet provided at the ozone generator, so that upon starting the water supply, the electric circuit is automatically activated allowing the delivery of ozone from the ozone generator to the mixer supply water mixed with ozone, thus to achieve the benefits of easy operation, simplified components and lowering of cost.

Related structure and functions of the present invention will be apparent from the following description.

DETAILED DESCRIPTION OF THE INVENTION

Figure 1:
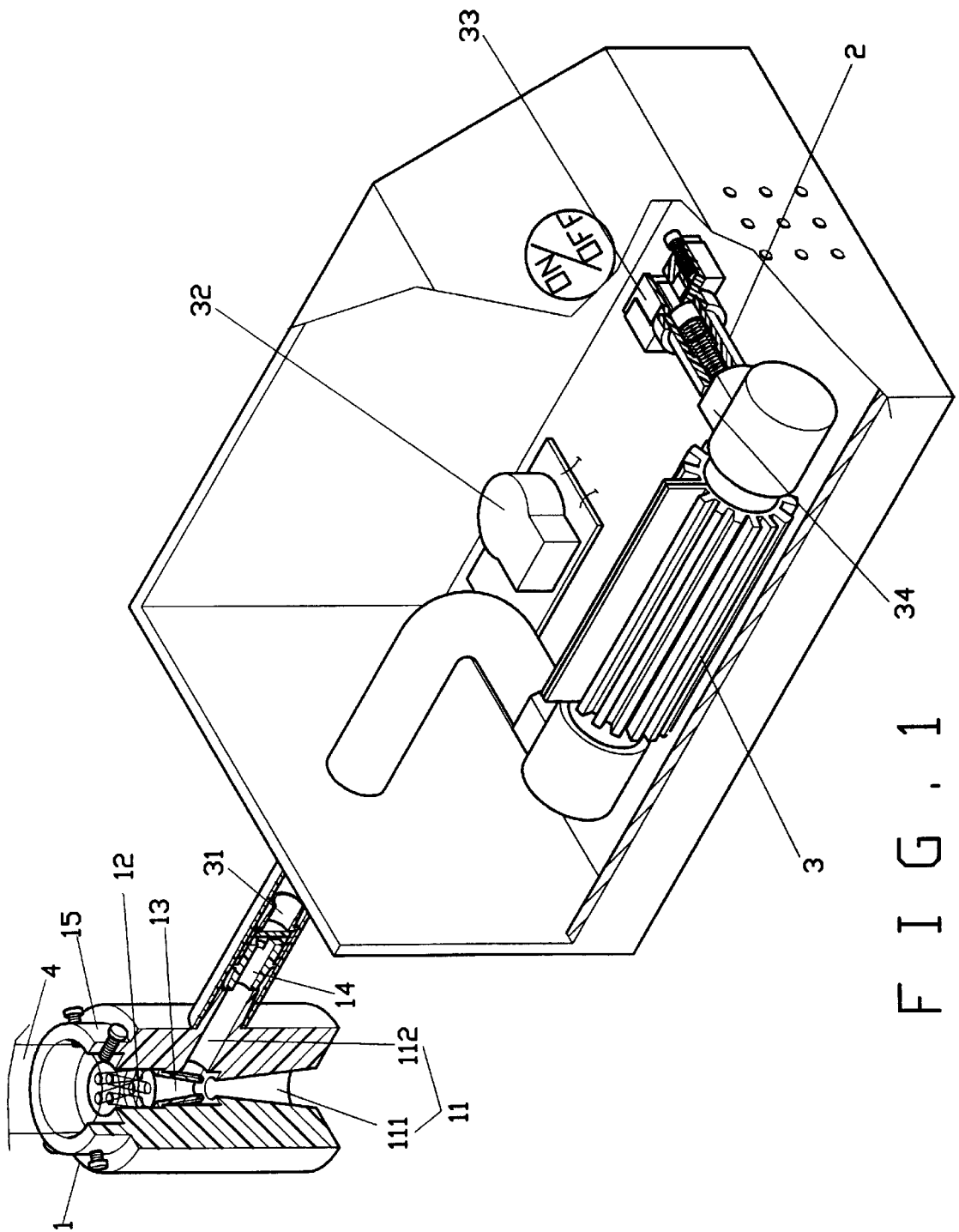
FIG. 1 is a view of the structure of a preferred embodiment of the present invention.

Referring to FIG. 1, a preferred embodiment of the present invention is comprised of a mixer (1), an actuator (2) and an ozone generator (3), within, the mixer (1) is connected to a lateral pipe (112) with a standpipe (111) to form a tee (11); the upper end of said standpipe (111) is provided with a retaining ring (15) which is connected and fitted to a spout of a tap (4), of a type varies depending on that of the tap (4) used; a screen mesh (12) and an injection pipe (13) are provided within the said standpipe (111) close to said upper end while the lower end of said standpipe (111) is the outlet of the water mixed with ozone; said lateral pipe (2) from the tee (11) is connected to a one-way valve (14) and farther to the outlet (31) of said ozone generator (3); said actuator (2) is provided at the air inlet (34) to said ozone generator (3); therefore, upon the supply of water, a control circuit (32) is automatically activated to permit the ozone produced from said ozone generator (3) to be delivered to said mixer (1) where the ozone is mixed with water and released from the other end of said standpipe (111). Furthermore, whereas the components and assembly of both said ozone generator (3) and said control circuit (32) are well known practices to those who are familiar with such arts, and will not be repeated herein.

Figure 2:
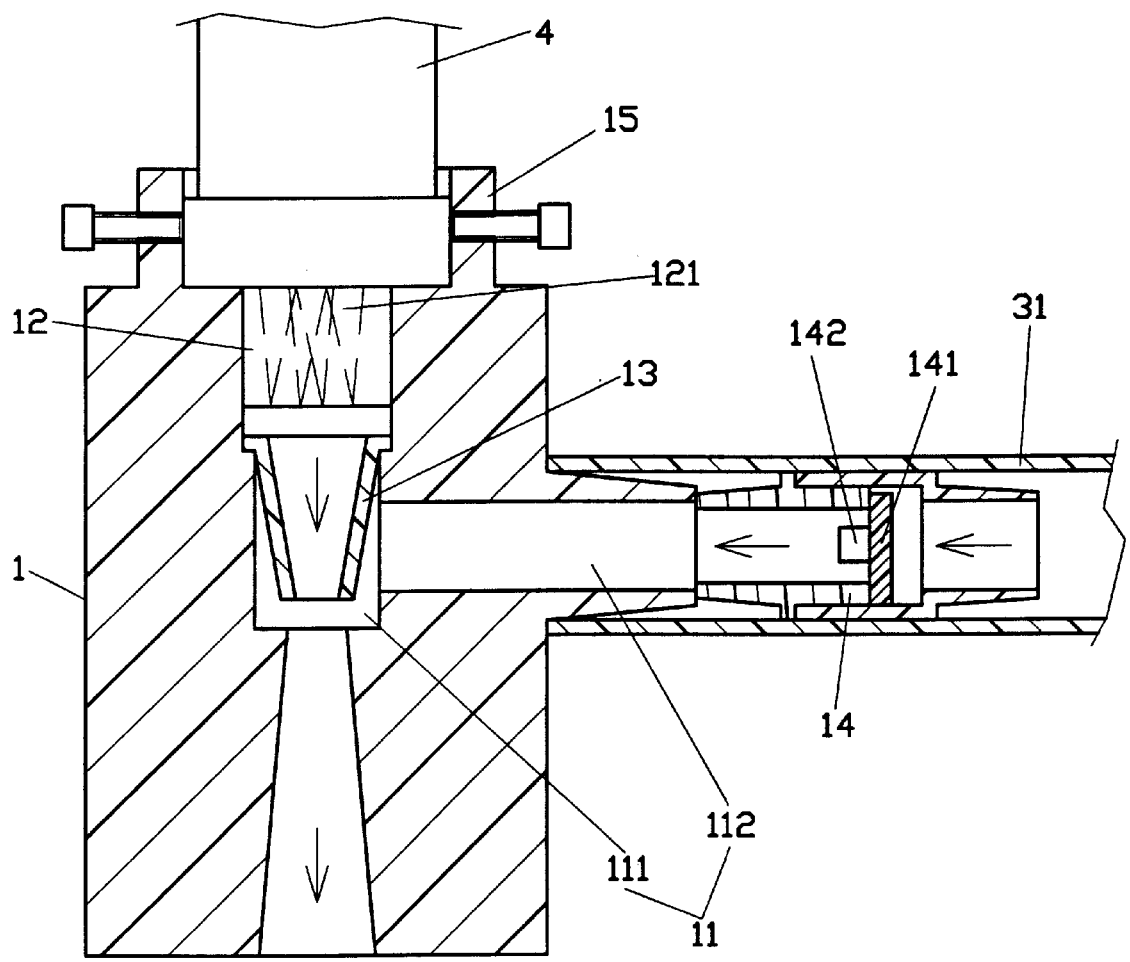
FIG. 2 is an enlarged sectional view of a mixer of the preferred embodiment of the present invention.

Now, referring to FIG. 2 for the detailed structure of said mixer (1). As illustrated, said mixer (1) is comprised of the tree (11), the injection pipe (13), the one-way valve (14) and the retaining ring (15), within, the tee (11) is comprised of the standpipe (111) connected to the lateral pipe (112) with a regressed diameter formed in the center of said standpipe (111); the screen mesh (12) and the injection pipe (13) are provided in order downwards inside the standpipe (111) above said regressed diameter, within, said screen mesh (12) is provided with a multiple of spiral hole (121), and said injection pipe (13) with its shape resembling that of a funnel; said lateral pipe (112) is connected to the side of said standpipe (111) at where above the regressed diameter, said lateral pipe (112) is also connected to the one-way valve (14) which is comprised of two mutually snapped on hollow pipes and a blockage (141) with its inner diameter corresponding to that of the hollow pipe, also a radius through trough (142) is provided at the pipe edge inside the pipe to be circulated in one-way so to achieve the one-way circulation via said though (142) even when said blockage (141) is holding against said pipe allowing one-way circulation. With the one-way circulation, the water passing through the hole (121) develops spiral vortex, which is further clustered by the cylindrical injection for the water outflow to be accelerated. Furthermore, said one-way valve (14) is provided to prevent the water from flowing back into the ozone generator (3).

Figure 3:
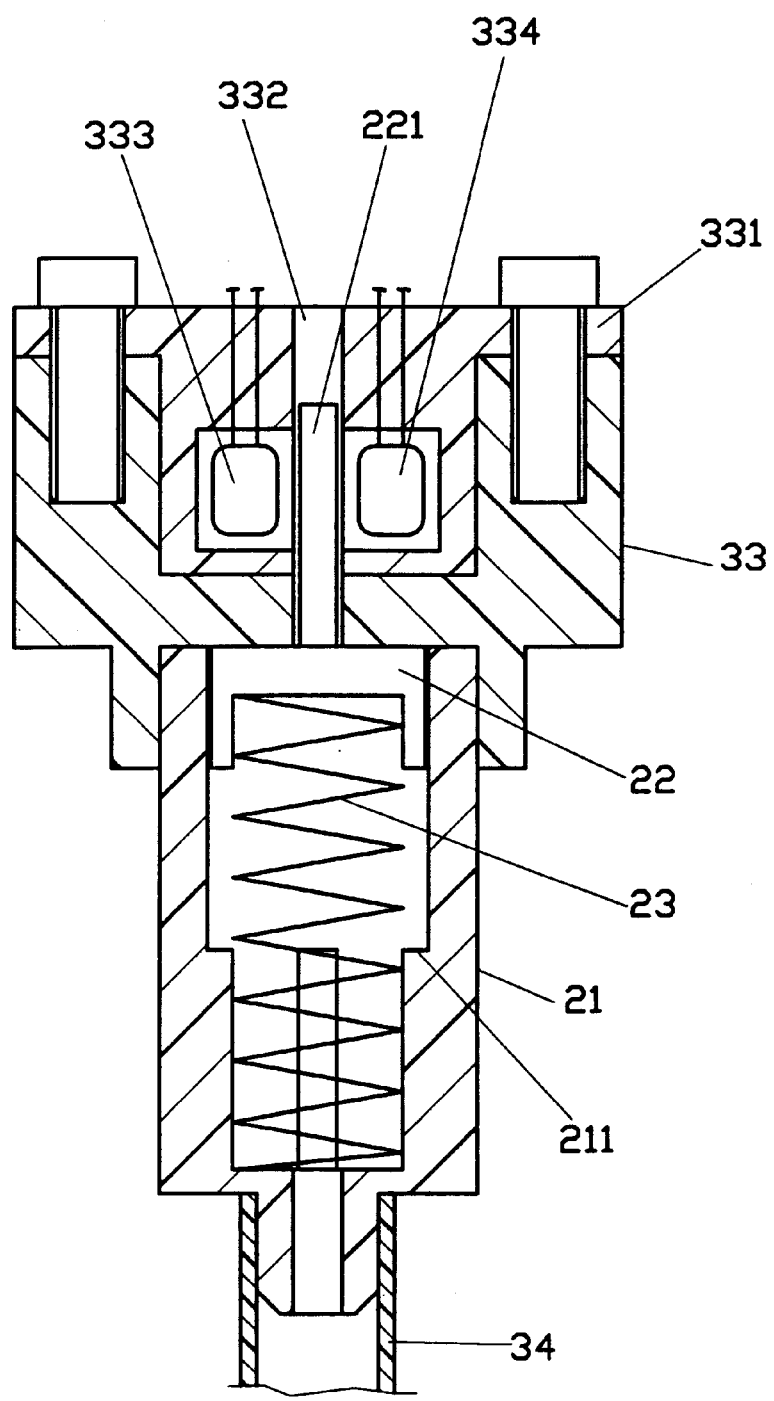
FIG. 3 is an enlarged sectional view of an actuator of the preferred embodiment of the present invention.

As illustrated in FIG. 3, the structure of the actuator (2) is comprised of a hollow cylinder (21), a plunger (22) and a spring (23). Within, said hollow cylinder (21) is with its diameter regressed at its lower end to be connected to the air inlet (34) of the ozone generator (3) while at the lower portion inside the cylinder (21) a multiple ribs (211) are provided to confine the sliding travel of the plunger (22) contained within the cylinder (21); a switch (33) is provided to the control circuit (32) in the ozone generator (3) and a spring (23) is provided within and holding against the plunger (22) and the base of the cylinder (21); said plunger (22) is linked to said switch (33) and the outer diameter of said plunger (22) is between the inner diameter of said cylinder (21) and that of the rib (211), the loading force of said spring (23) is merely sufficient to push back the plunger (22) in the absence of air pressure inside and outside said cylinder (21) while keeping away the air inside and outside said cylinder (21). Furthermore, the embodiment of the switch (33) is not limited and a micro-switch available in the market may be used. However, in the preferred embodiment of the present, said switch (33), a light shielding device, is comprised of a T-shaped base (331) with a hole (332) provided at its center, a photo-sensitive resistor (333) and an illuminator (334), e.g., an LED, are respectively provided to both sides of said hole (332), and a T-shaped sheet stopper (221) to interrupt between said photo-sensitive resistor (333) and said illuminator (334) when normally the water supply source is turned off, so to prevent the actuation by the control circuit (32) of said ozone generator (3).

Figure 4:
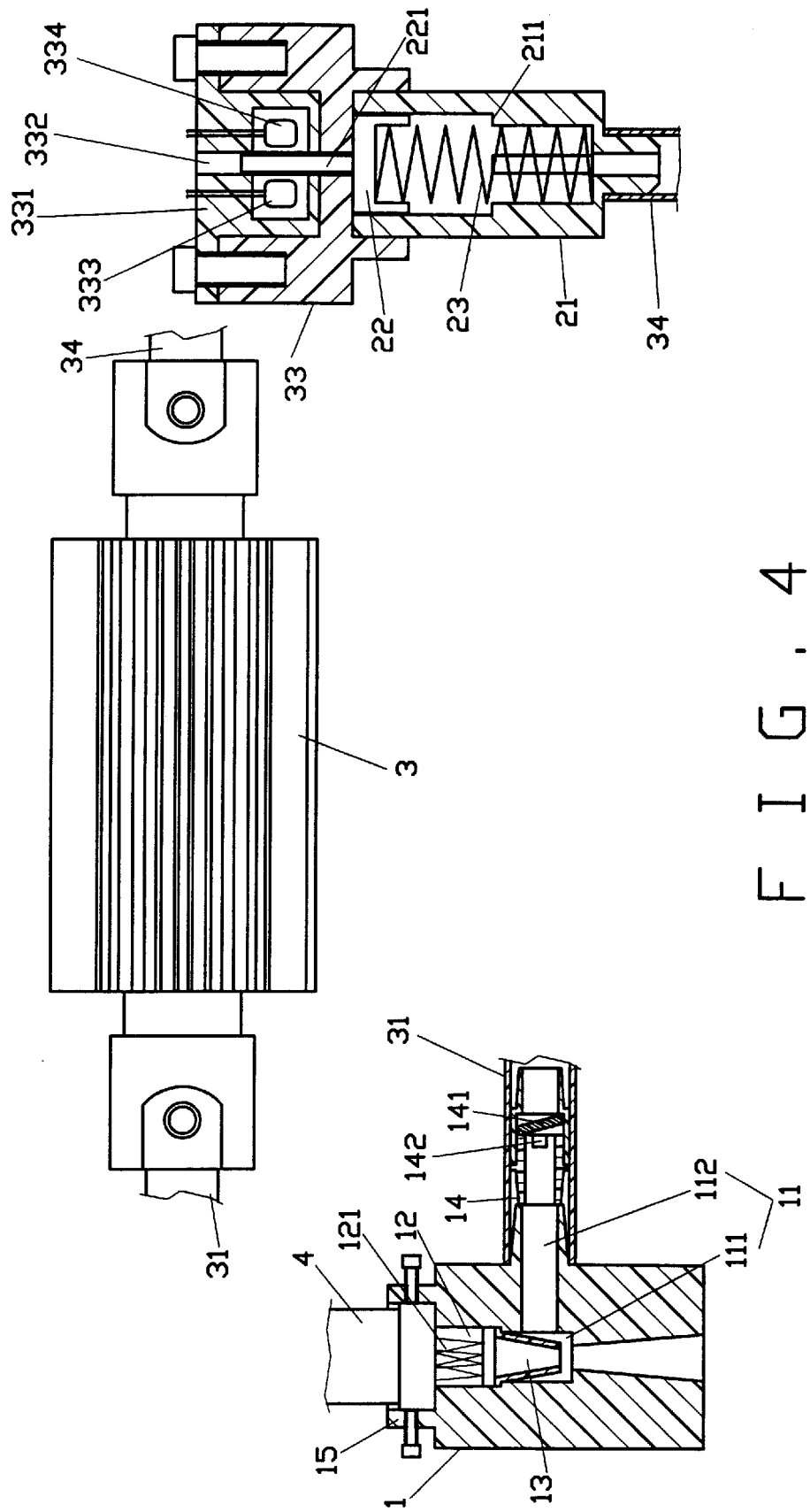
FIG. 4 is a view of the preferred embodiment of the present invention before the actuation.
Figure 5:
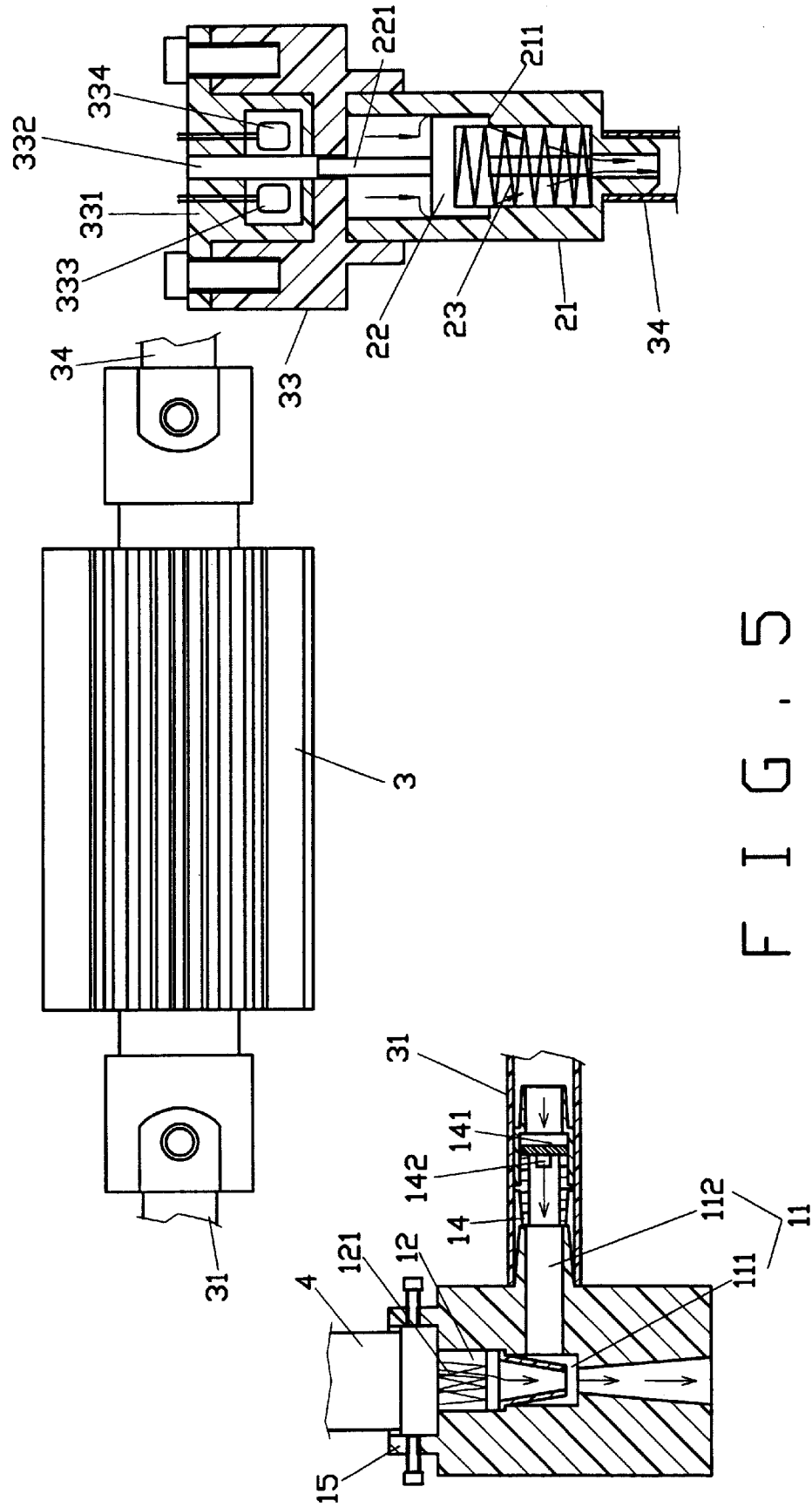
FIG. 5 is a view of the preferred embodiment of the present invention in operation.
Figure 6:
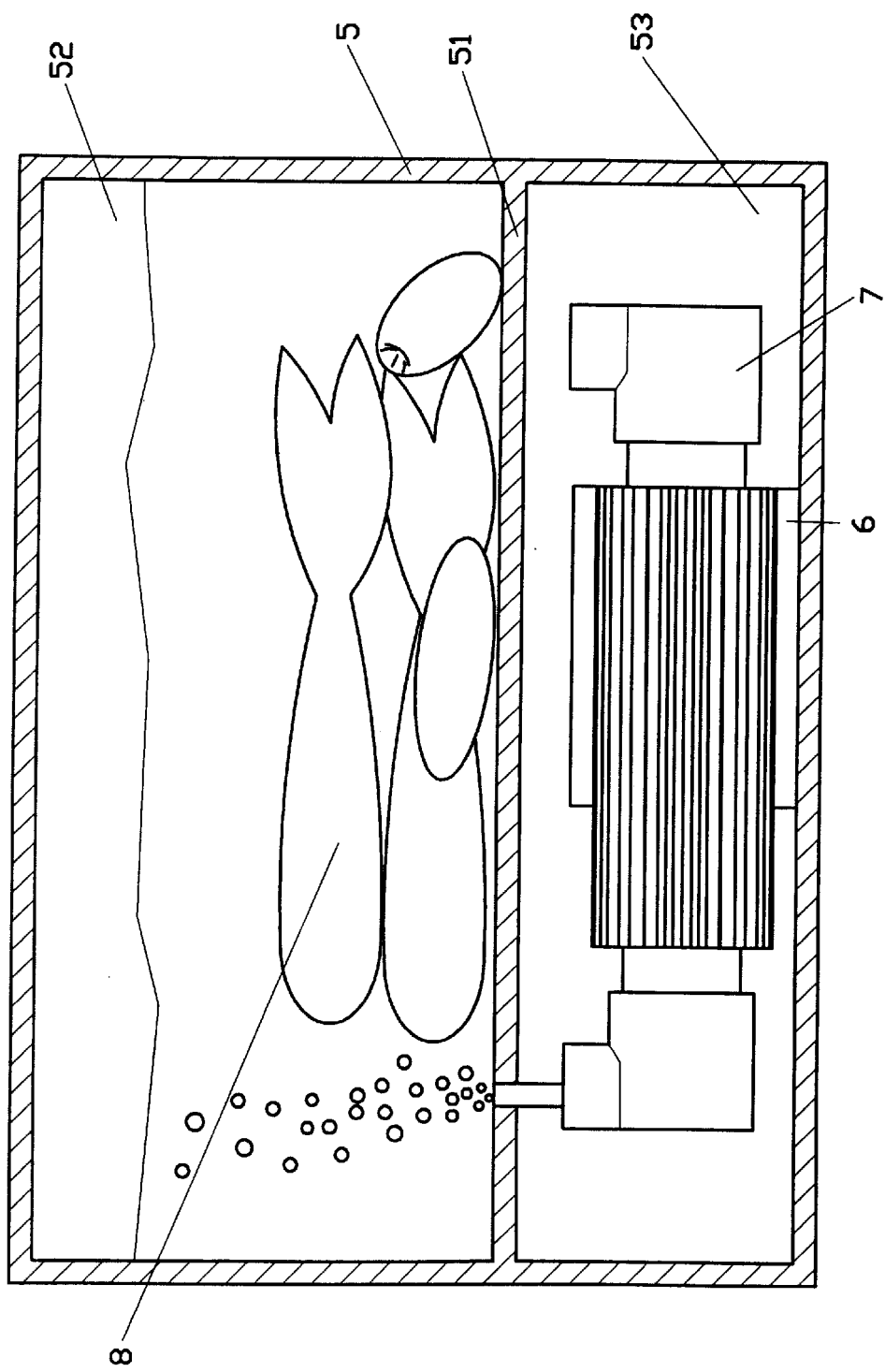
FIG. 6 is a view of a structure and its operation of a prior art.

As illustrated in FIG. 4 when the water supply source is normally turned off, said mixture (1) and said actuator (2) maintain their configuration as described above. Meanwhile, said sheet stopper (221) is situated between the photo-sensitive resistor (333) and the illuminator (334), and the plunger (22) is holding against the ribs (211) to keep off the air inside and outside the cylinder (21). As illustrated in FIG. 5, once the tap (4) is turned on to permit the water flowing through the screen mesh (12) in the mixer (1), then flowing out in the form of spiral vortex after passing through said hole (121), the accelerated flow then enters into said injection pipe (13) to be accelerated once again by the reduced area of outflow due to the funnel shaped injection pipe (13); the flow at high speed forces the air within said lateral pipe (112) to reduce its side pressure and be drawn out; the air pressure inside said cylinder (21) is thus reduced and the plunger (22) is sucked to descend to compress the spring (23); when the plunger (22) descends to press against the ribs (211), said sheet stopper (221) clears away from the space between the photo-sensitive resistor (333) and the illuminator (334) and activates the control circuit (32) to the ozone generator (3), fresh air then enters into the air inlet (34) to the ozone generator (3) through the gaps between each rib (211) and the plunger (22) of the cylinder (21).

When the tap (4) is once again turned off, the preferred embodiment returns to its state as illustrated in FIG. 4 and the power supply to the control circuit (32) is automatically turned off.

I claim:

1. An ozone and water mixing device, comprising a mixer for mixing ozone and water, connected to water supply and an ozone generator, having a tee formed by a standpipe connected to a lateral pipe, and the ozone generator, controlled by an electric circuit for producing ozone, one end of the standpipe is connected to water supply, a screen mesh having a spiral hole and a funnel shaped injection pipe provided in the standpipe at said end, the other end of the standpipe is the outlet of the ozone mixed with water, and the lateral pipe is connected to a one-way valve and farther to the outlet of the ozone generator.

2. As claimed in claim 1, the ozone and water mixing device, further comprising, an actuator is provided at air inlet of the ozone generator and linked to a switch of the circuit, the actuator comprises a plunger in a cylinder, a spring is provided between and holding against the plunger and the base of the cylinder, and the plunger is linked to the switch of the circuit.

3. As claimed in claim 2, the ozone and water mixing device, wherein, the cylinder of the actuator is hollow with regressed diameter at the lower end of the cylinder, and ribs are provided in the lower space in the cylinder to limit sliding travel of the plunger, and the outer diameter falling between the inner diameter of the cylinder and that of the rib.

4. As claimed to claim 2, wherein the circuit switch is a light shield having a T-shaped base with a hold provided in its center, an illuminator and a photo-sensitive resistor respectively at both sides to the hole, and a T-shaped sheet stopper protruding from the plunger of the actuator to interrupt the communication between the illuminator and the light sensitive resistor in the absence of water supply.

* * * * *